O. OVERTON.
SIDE CAR ATTACHMENT FOR MOTOR CYCLES.
APPLICATION FILED MAY 24, 1912.

1,077,743.

Patented Nov. 4, 1913.

2 SHEETS—SHEET 1.

WITNESSES
Howard D. Orr.
H. T. Riley

Oron Overton, INVENTOR,
BY
E. G. Siggers
ATTORNEY

COLUMBIA PLANOGRAPH CO., WASHINGTON, D. C.

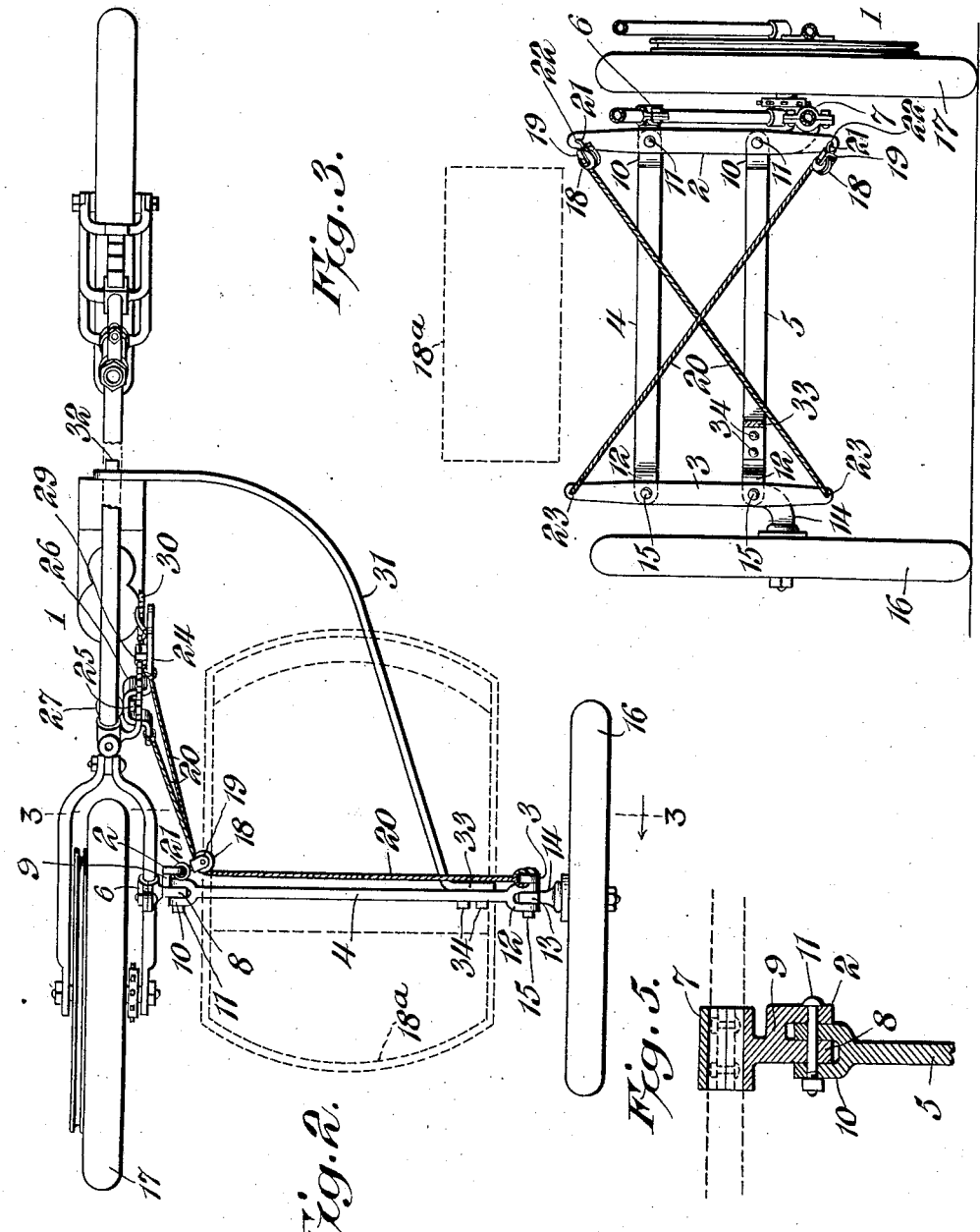

UNITED STATES PATENT OFFICE.

ORON OVERTON, OF MOBILE, ALABAMA.

SIDE CAR ATTACHMENT FOR MOTOR-CYCLES.

1,077,743.  Specification of Letters Patent.  Patented Nov. 4, 1913.

Application filed May 24, 1912.  Serial No. 699,490.

*To all whom it may concern:*

Be it known that I, ORON OVERTON, a citizen of the United States, residing at Mobile, in the county of Mobile and State of Alabama, have invented a new and useful Side Car Attachment for Motor-Cycles, of which the following is a specification.

The invention relates to improvements in motor cycles and motor vehicles.

The object of the present invention is to improve the construction of motor cycles and motor vehicles, and to provide a simple, practical and comparatively inexpensive attachment adapted to be readily applied to a motor vehicle, and equipped with a side wheel and provided with means for laterally adjusting the wheel and the motor cycle for arranging the same in a vertical position, or at an angle to the vertical irrespective of the character of the surface of the track or road to enable a motor cycle or motor vehicle to be maintained in an upright position on an inclined surface, and also to be run at a high speed on a level track or other surface with safety, especially while turning the machine at the curves of a track or bends of a road.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
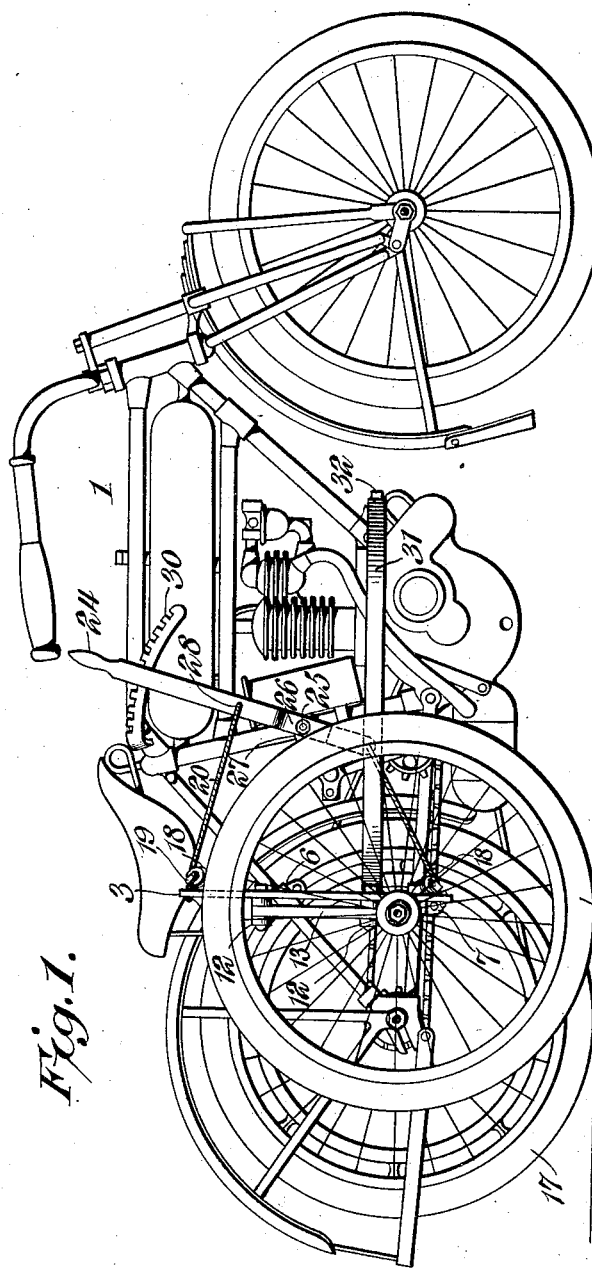
Figure 4:
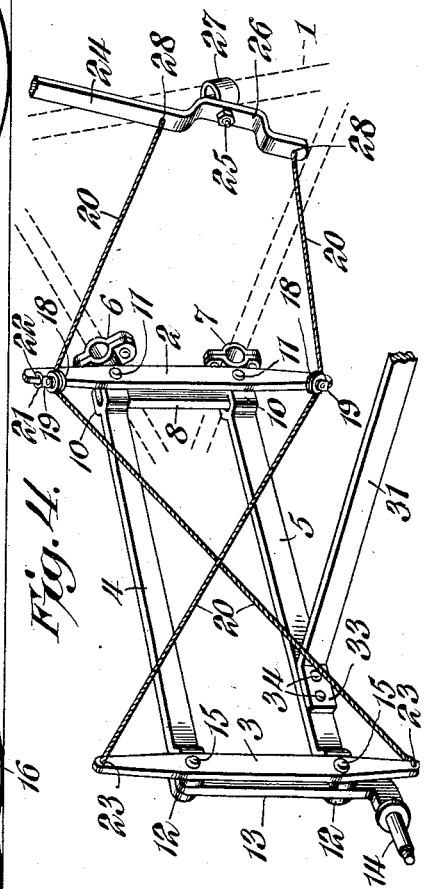

In the drawings:—Figure 1 is a side elevation of a motor cycle provided with an attachment, constructed in accordance with this invention. Fig. 2 is a plan view of the same. Fig. 3 is a transverse sectional view, taken substantially on the line 3—3 of Fig. 2. Fig. 4 is a perspective view of the attachment, the wheel being removed and a portion of the motor cycle frame being shown in dotted lines. Fig. 5 is an enlarged detail sectional view, illustrating the construction of the inner upright bar or lever.

Like numerals of reference designate corresponding parts in all the figures of the drawings.

In the accompanying drawings in which is illustrated the preferred embodiment of the invention, the attachment, which is applied to a motor cycle 1, comprises in its construction inner and outer upright parallel bars or levers 2 and 3, connected by upper and lower link bars 4 and 5 pivotally connected with the said bars or levers 2 and 3 at points spaced from the ends thereof to form upper and lower projecting arms. The inner upright bar or lever 2 is equipped with suitable clamps 6 and 7 and is secured to the rear portion of the frame of the motor cycle by the same. The clamps 6 and 7 are of the ordinary sectional construction and are set to correspond to the arrangement of the frame bars to which they are secured, but any other suitable means may be employed for connecting the attachment to the rear portion of a motor cycle of any type.

The inner bar or lever 2 is equipped with an upright flange 8, arranged in spaced relation with the rear face of the bar or lever 2 and connected with the same by an integral web or portion 9, as clearly illustrated in Fig. 5 of the drawings. One of the sections of each of the clamps is also preferably formed integral with the bar or lever 2, as indicated in the said figure. The inner ends 10 of the upper and lower links or bars 4 and 5 are forked or bifurcated to straddle the flange 8, and they are pivoted to the upright bar or lever by bolts 11, or other suitable fastening devices, which pierce the bar or lever 2, its flange 8 and the bifurcated ends 10 of the link bars 4 and 5. The outer ends 12 of the link bars 4 and 5 are bifurcated to receive an upright arm or shank 13 of a spindle 14, and are pivoted to the outer upright bar or lever 3 by bolts 15, or other suitable fastening devices, which pierce the bar or lever 3, the ends 12 of the link bars and the shank of the spindle and connect the said parts.

The spindle 14 receives an outer side wheel 16, and the inner and outer levers and the upper and lower link bars form an adjustable transverse frame for connecting the side wheel with the frame of the motor cycle. The transversely disposed connecting frame maintains the outer side wheel 16 in parallelism with the rear wheel 17 of a motor cycle, and it is capable of adjustment to arrange the said wheels either in a vertical position or at an angle to the vertical. The side frame may be equipped with a basket or body 18ª to form a side car, as indicated in dotted lines in Figs. 2 and 3 of the drawings, and the said basket or body may be supported in any suitable manner, and may be employed for carrying persons or luggage.

In the operation of the ordinary side cars of motor cycles, the rigid position of the wheels allows the vehicle to run smoothly on a flat road or track. But in the case of crown built roads or roads with wheel ruts, the wheels on one side are lower than the other and the rigid position of the wheels in motor vehicles of the present type causes such vehicles to tend to turn in the direction of the lower wheel, which tendency is overcome in the present type of cars by turning the steering wheel in the opposite direction. This causes great wear on the tires and greatly increases the road friction on the wheels and diminishes the power or speed of the vehicle, causing great and violent strains to all connections between the side car and the motor cycle as well as on the wheels and tires of motor cycles and the side car. The adjustment of the transverse frame and the lateral adjustment of the wheels overcome the tendency of a vehicle to turn in the direction of the lowest wheel without causing any of the said strains. Also when a motor cycle with a side car of the ordinary construction is running on a curved road or track or is turning a corner, the tendency of such vehicle is to continue in the original direction or at a tangent to the curve. The effect of this is that the vehicle in turning in one direction has a tendency to overturn and in turning in the other direction produces a lateral motion in the wheel of the side car tending to collapse the wheel. This tendency of the machine to continue in the direction of the tangent to a curve is obviated by changing the position of the wheels from a vertical position to an inclined position, the inclination being in the direction in which the vehicle is turning. This will enable vehicles to be operated around curves with reasonable high speed without danger of overturning, or of causing the wheels to collapse on account of lateral strain. Furthermore, this lateral adjustment of the wheels from a vertical to an inclined position is adapted to reduce to a minimum the great danger in automobiles running on curved tracks at high speed and causing the lateral strain on the wheels, which often tears the tire from the rim or collapses the wheel. The said adjustment of the wheels from a vertical to an inclined position eliminates the lateral strain and with it the danger of collapsing the wheel or pulling off the tire.

In the accompanying drawings, one form of adjusting means is illustrated for effecting the lateral adjustment of the wheels, but it will be apparent that this may be accomplished in a variety of ways. The inner and outer upright bars or levers are extended above and below the plane of the upper and lower link bars, and the inner bar or lever 2 is equipped at its ends with grooved guide pulleys 18, mounted in suitable casings 19 and receiving ropes or cables 20, or other suitable flexible connections. The casings 19 are provided with eyes 21, which are linked into openings 22 of the inner upright bar or lever 2. The ropes or cables 20, which are crossed diagonally at the center of the transverse frame, are secured at their outer terminals in eyes or openings 23 of the upper and lower ends of the outer upright bar or lever 3, and they extend from the ends of the bar or lever 3 in opposite directions to the guide pulleys 18 and pass around the same, the inner portions of the ropes or cables being extended forwardly and connected to an upright operating lever 24 at opposite sides of the pivot bolt 25 thereof. The lever 24, which is provided adjacent to its lower end with a laterally bent or offset portion 26, is mounted on the bolt 25, which is carried by a collar 27 arranged on and suitably secured to the frame of the motor cycle. The lever is provided above and below its pivotal point with perforations 28 for the attachment of the inner portions of the ropes or cables.

The upper end of the operating lever is provided with a handle, and is equipped with a dog or detent 29 for engaging a toothed segment 30, but any other suitable means may, of course, be employed for securing the operating lever in its adjustment. The operating lever, which is arranged in advance of the seat of the motor cycle, is within easy reach of the operator, and is adapted to be instantly adjusted to change the position of the wheels either to maintain the same in a vertical position on an inclined surface or to arrange them at an inclination on a flat or other surface.

The outer portion of the transverse frame is connected with the front portion of the frame of the motor cycle by means of an approximately L-shaped brace 31, consisting of a transverse front portion and a longitudinal rear portion and curved at its intermediate portion. The front end of the brace is connected with the frame of the motor cycle by a suitable pivot 32, arranged horizontally and adapted to permit a pivotal movement of the brace to conform to the pivotal adjustment of the transverse frame. The rear end 33 of the brace is bent at an angle and is secured to the front face of the lower link bar by bolts 34, or other suitable fastening means.

I desire it to be understood that the invention is not limited in its application to motor cycles, but may be used on automobiles and various other motor vehicles.

What is claimed is:—

1. In a vehicle of the class described, the combination of a frame, a seat carried thereby, opposite wheels arranged in spaced relation, mechanism for connecting and maintaining the wheels in parallelism, an operating device spaced from the said mechanism and arranged adjacent to the seat within easy reach of the occupant, and connections between the operating device and the said mechanism for adjusting the latter to arrange the wheels either in a vertical or an inclined position, said device being capable of operation while the vehicle is in motion.

2. The combination with a motor cycle, of a side wheel arranged in spaced relation with the rear portion of the motor cycle, mechanism for connecting the side wheel with the motor cycle and for maintaining the same in parallelism with the rear wheel of the motor cycle, an operating device mounted on the frame of the motor cycle in spaced relation with the said mechanism, and connections between the operating device and the said mechanism for adjusting the latter to arrange the wheels either in a vertical or inclined position.

3. The combination with a motor cycle, of a transverse frame connected with and extending from the rear portion of the motor cycle and including inner and outer upright bars, and upper and lower link bars pivoted to the upright bars at points spaced from the ends thereof to form upper and lower projecting arms and maintaining the inner and outer upright bars in parallelism, said frame being provided at the outer portion with a spindle, a wheel mounted on the spindle, an operating device mounted on the frame of the motor cycle, and connections between the operating device and the said upper and lower projecting arms of the transverse frame for adjusting the latter to arrange the wheels either in a vertical or inclined position.

4. The combination with a motor cycle, of a transverse frame connected with and extending from the rear portion of the motor cycle and including inner and outer upright bars, and upper and lower link bars pivoted to and connecting the bars and maintaining the same in parallelism, said frame being provided at its outer portion with a spindle, a wheel mounted on the spindle, guides mounted on the upper and lower portions of the inner upright bar, flexible connections connected at their outer ends with the upper and lower portions of the outer upright bar and extending diagonally of the frame in opposite directions to the said guides and arranged in the same, and operating means connected with the inner portions of the flexible connections for simultaneously adjusting the same.

5. The combination with a motor cycle, of a transverse frame connected with and extending from the rear portion of the motor cycle and including inner and outer upright bars, and upper and lower link bars pivoted to and connecting the bars and maintaining the same in parallelism, said frame being provided at its outer portion with a spindle, a wheel mounted on the spindle, guides mounted on the upper and lower portions of the inner upright bar, flexible connections connected at their outer ends with the upper and lower portions of the outer upright bar and extending diagonally of the frame in opposite directions to the said guides and arranged in the same, and an upright operating bar pivoted at an intermediate point on the motor cycle and having the inner portions of the flexible connections connected to it at opposite sides of its pivot.

6. The combination with a motor cycle, of an adjustable transverse frame having upper and lower clamps connected with the rear portion of the frame of the motor cycle, a wheel carried by the outer portion of the transverse frame and maintained by the same in parallelism with the rear wheel of the motor cycle, means for adjusting the said frame to arrange the wheels in a vertical or inclined position, and a brace rigidly secured to the outer portion of the transverse frame and extending to the front portion of the motor cycle and pivotally connected therewith.

In testimony, that I claim the foregoing as my own, I have hereto affixed my signature in the presence of two witnesses.

ORON OVERTON.

Witnesses:
  Ed. J. Grove,
  Jno. W. McAlpine.

Copies of this patent may be obtained for five cents each, by addressing the "Commissioner of Patents, Washington, D. C."